(No Model.)

L. F. WETZELL.
AUTOMATIC ADVERTISING DEVICE.

No. 355,578. Patented Jan. 4, 1887.

Witnesses.

Inventor:
Louis F. Wetzell
By James L. Norris
Atty.

UNITED STATES PATENT OFFICE.

LOUIS F. WETZELL, OF ATLANTA, GEORGIA.

AUTOMATIC ADVERTISING DEVICE.

SPECIFICATION forming part of Letters Patent No. 355,578, dated January 4, 1887.

Application filed September 18, 1886. Serial No. 213,924. (No model.)

*To all whom it may concern:*

Be it known that I, LOUIS F. WETZELL, a citizen of the United States, residing at Atlanta, in the county of Fulton and State of Georgia, have invented new and useful Improvements in Automatic Advertising Devices, of which the following is a specification.

My invention relates to an automatic advertising show-stand for store-windows, and comprises the representation of a butterfly or other winged insect or figure placed on an artificial flower or plant.

The invention consists in the combination, with an artificial plant or flower, of an artificial insect, animal, or figure having automatically-movable wings, said plant and figure, either or both, being adapted to display articles of jewelry or like goods in a show window or case.

The invention also consists in the construction and combination of devices for moving the wings of the insect or figure, and for opening and closing a receptacle in the plant or flower, or for moving the leaves, as hereinafter more fully set forth.

Figure 1:
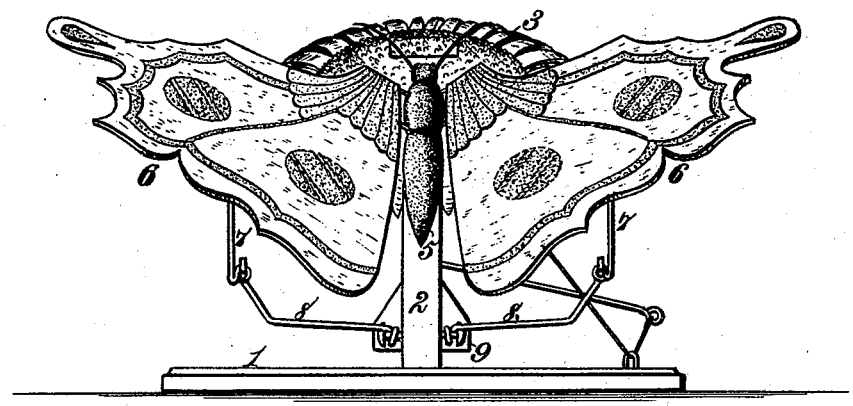
Figure 2:
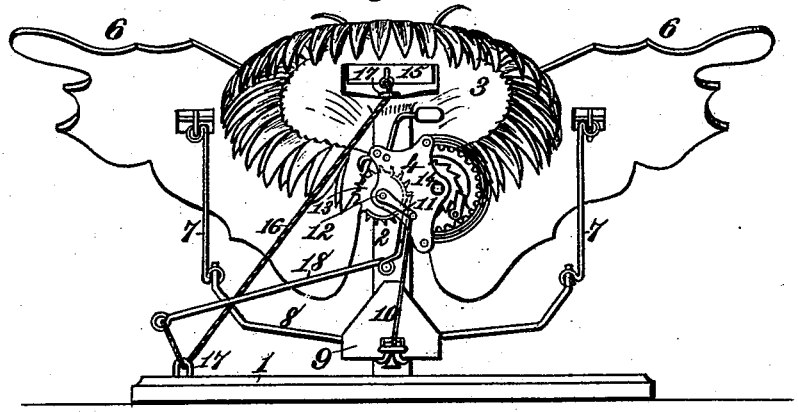
Figure 3:
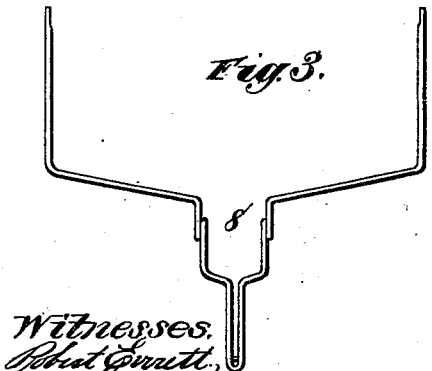
Figure 4:
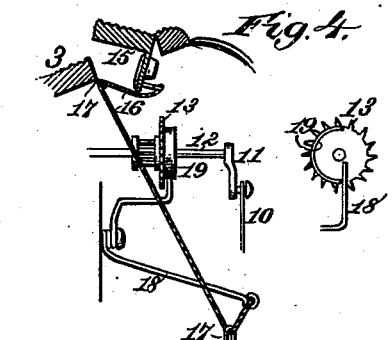

In the annexed drawings, Figure 1 is a front elevation of my improved automatic show-stand or advertising device. Fig. 2 is a rear elevation of the same. Fig. 3 is a detail view; Fig. 4, a detail sectional view.

Referring to the construction shown, the numeral 1 designates the base, and 2 the upright portion, of a pedestal that supports the advertising devices and their operating mechanism. The upright portion of this pedestal may represent the stalk of a plant, and carries the artificial flower 3 at its top. To the stalk or upright 2 is also attached a clock mechanism, 4, and its connections for operating the moving parts of the advertising devices.

Upon the flower 3 is placed an artificial butterfly, 5, having wings 6 hinged or pivoted to its body in any suitable manner. The under side of each wing 6 is connected by a rod, 7, to one end of a bifurcated angular lever, 8, that partly surrounds the lower part of the upright 2, and is pivoted to the opposite side thereof. The rear portion of the lever 8 carries a counterbalance-weight, 9, and is connected by a pitman, 10, to a crank, 11, on the shaft 12 of the clock-escapement 13.

The clock mechanism may be of any suitable or well-known construction, and is wound by means of a key applied to the arbor 14.

It will be seen that when the clock is wound the rotation of the shaft 12 and attached crank 11 will actuate the pitman 10 and bifurcated lever 8, so as to move both wings 6 of the insect or figure on the flower.

In the body of the flower 3 may be arranged an automatically-movable receptacle, 15, hinged at one side, so as to be capable of being alternately raised and lowered by the action of the clock-movement. When lowered or closed, the top of the receptacle is continuous, and when opened or raised it is capable of displaying a collection of gems that may be placed therein. To the lower side of this receptacle 15 is attached one end of a cord, 16, which is passed through eyes or pulleys 17 on the upright 2 and base 1, and is connected at its other end to one end of a bell-crank lever, 18, that is pivoted to the rear side of the upright. The other end of this bell-crank lever 18 is arranged to engage a cam, 19, on one face of the escapement-wheel 13, the rotation of which is thus made to raise and lower the gem-receptacle 15 at intervals.

If desired, the cord 16, (one or more,) instead of being attached to the receptacle 15, may be connected with the leaves of the plant or flower, and so impart motion thereto.

The artificial plant or flower, and the wings and body of the figure placed thereon, may be made of any appropriate material suitable to the display of articles of jewelry and like goods in an attractive manner.

Advertising matter of any kind, printed or otherwise, can be placed on the various parts of the device, if desired.

What I claim as my invention is—

1. An advertising device consisting of an artificial flower and a figure placed thereon, and provided with automatically-movable wings, substantially as described.

2. In an automatic advertising device, the combination, with a winged figure, of a clock mechanism, a weighted lever, and means for connecting said lever with the clock mechanism, and with the wings of the automatic figure, substantially as described.

3. In an automatic advertising device, the combination, with an artificial flower having a movable gem-receptacle, of a clock mechanism, a bell-crank lever, and means for connecting said lever with the clock mechanism, and with said movable receptacle, substantially as described.

In testimony whereof I affix my signature in presence of two witnesses.

LOUIS F. WETZELL.

Witnesses:
A. F. PICKERT,
J. A. DFOOR.